Patented Apr. 4, 1939

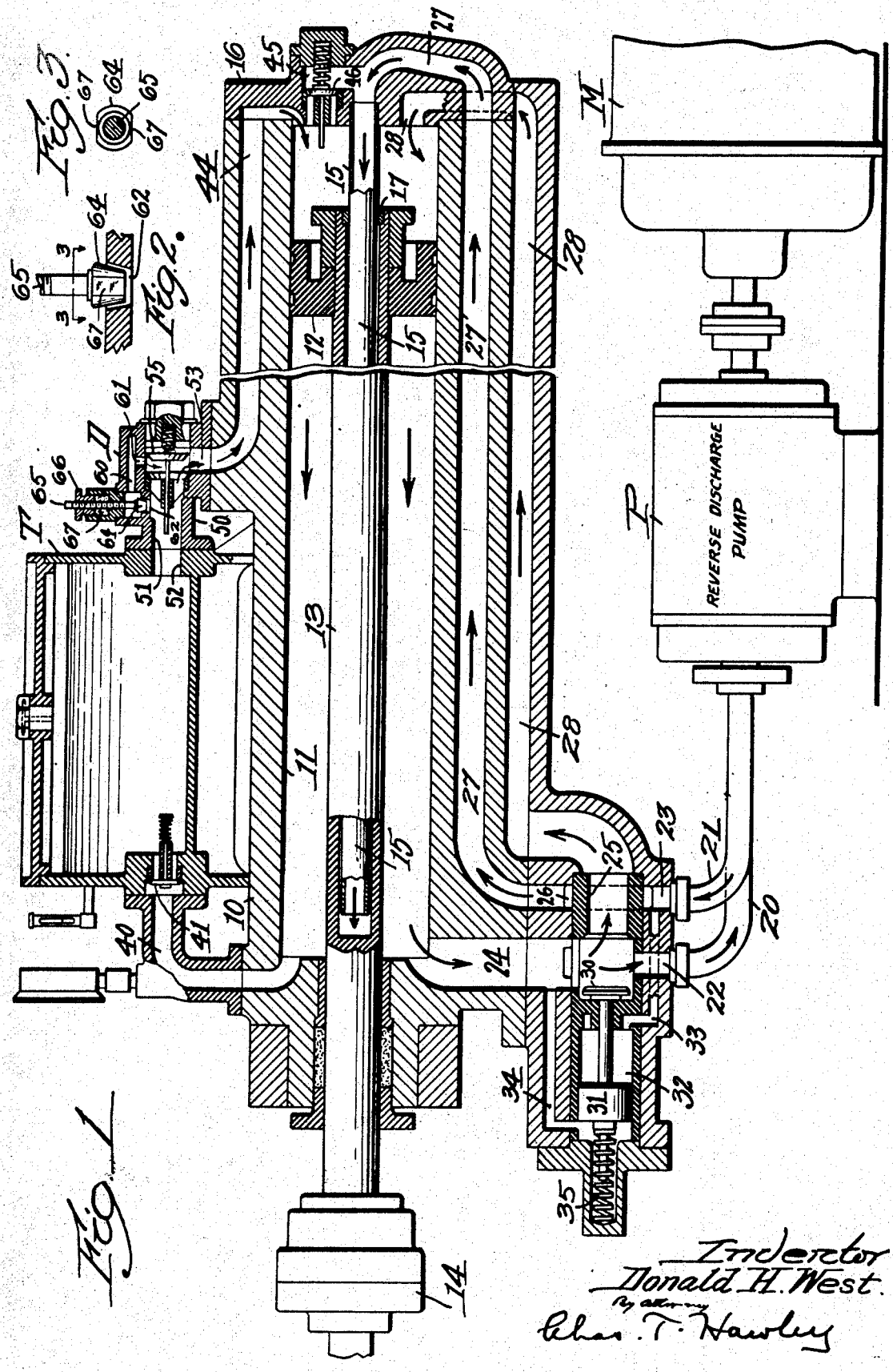

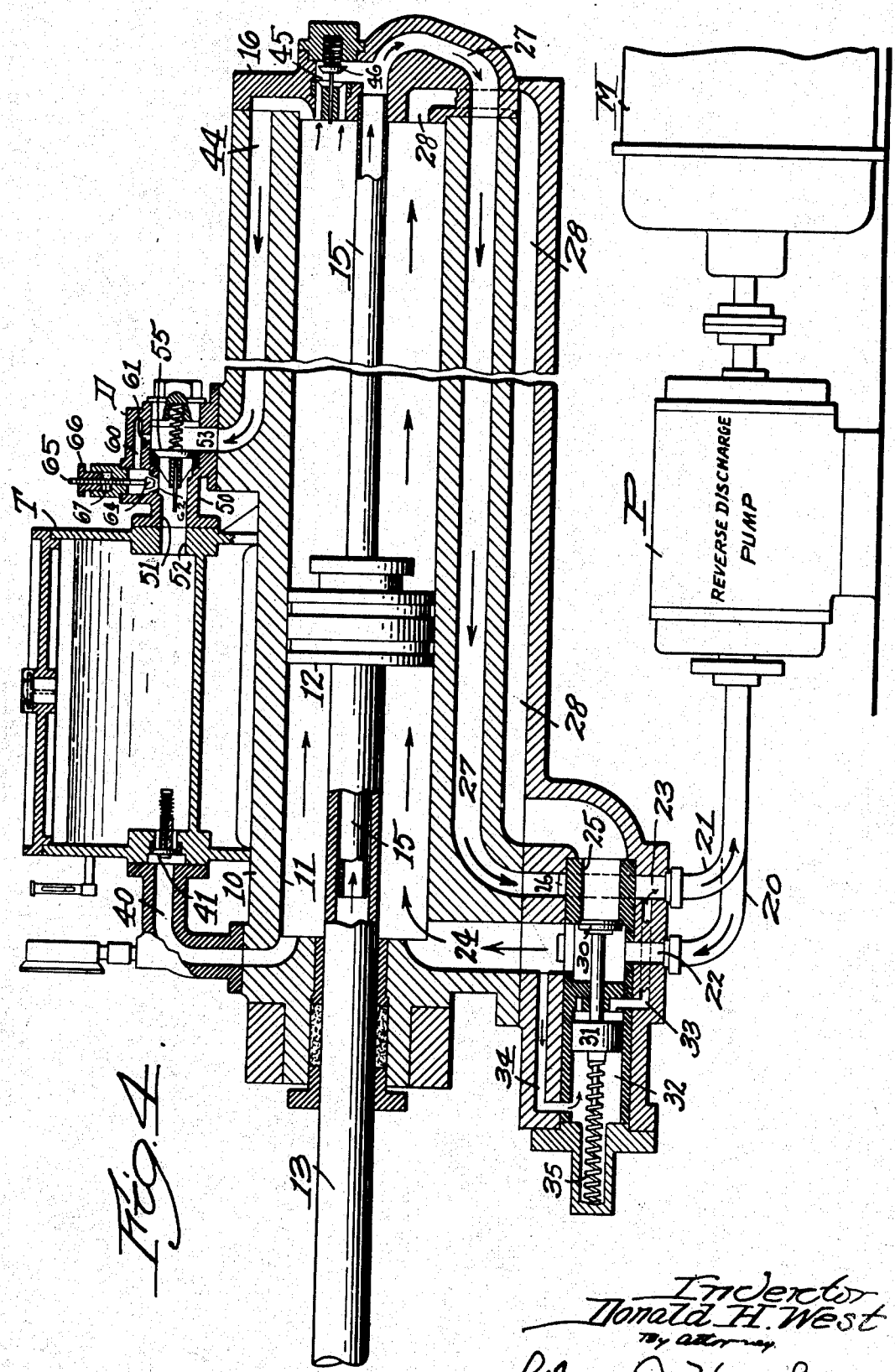

2,153,056

UNITED STATES PATENT OFFICE 2,153,056

HYDRAULIC DRIVE FOR MACHINE TOOLS

Donald H. West, Bolton, Mass., assignor to The Lapointe Machine Tool Company, Hudson, Mass., a corporation of Maine Application August 7, 1936, Serial No. 94,791

1 Claim. (Cl. 60—52)

This invention relates to hydraulic machines such as broaching machines, and relates more particularly to means for providing regulated back pressure in such machines.

In the operation of a hydraulic broaching machine, the tool resistance varies rapidly and substantially, the variation being due in part to open spaces or varying contours of the work and in part to regularly occurring changes in the number of teeth engaging the work.

With a given length of hole and a given spacing of teeth on the broach, the number of engaged teeth will commonly fluctuate rapidly, alternately increasing and decreasing by one tooth the number of teeth engaged as the broach is drawn through the work. Such regularly repeated fluctuations in tool resistance tend to produce irregular operation or chatter of the broach, with resulting imperfect work.

It is the general object of my invention to provide improved means for providing regulated back pressure during the working stroke of a broach or other similar tool, whereby such fluctuations in tool resistance will be rendered harmless.

Further objects are to provide unrestricted flow of the operating liquid, as oil, during the return stroke, and to provide means by which the amount of back pressure may be conveniently adjusted.

My invention further relates to arrangements and combinations of parts which will be hereinafter described and more particularly pointed out in the appended claim.

A preferred form of the invention is shown in the drawings, in which

Fig. 1 is a side elevation, largely in section, showing parts of a broaching machine embodying my invention in the position assumed during a return stroke;

Fig. 2 is an enlarged sectional elevation of a regulating valve;

Fig. 3 is a sectional plan view, taken along the line 3—3 in Fig. 2; and

Fig. 4 is a view similar to Fig. 1 but showing the parts in the position assumed during a working stroke.

Referring to Fig. 1, I have shown portions of a broaching machine including a fixed casing 10 having a cylinder 11 in which a piston 12 and piston rod 13 are slidable. The rod 13 is provided with a head or coupling 14 to which a broach or other similar tool may be attached.

The piston rod 13 is of tubular construction, and an inner tube 15 is fixed in the rear head 16 of the casing 10 and projects longitudinally within the tubular piston rod 13.

The tube 15 is open at its left-hand end, as viewed in Fig. 1 and the piston rod 13 is closed at its left-hand end, and the two parts telescope as the piston rod 13 moves to the right. A suitable packing 17 is provided for the tube 15 in the end of the piston rod 13.

The machine is operated by oil from a reversible discharge pump P continuously driven by a motor M. Pipes 20 and 21 connect the pump P to openings 22 and 23 in the casing 10. The opening 22 is connected through a passage 24 to the lefthand end of the cylinder 11 and the opening 23 is connected around a sleeve 25 through a port 26 into a passage 27 which in turn connects with the inside of the tube 15.

The passage 24 previously described is also connected through the sleeve 25 to a passage 28 which is connected to the right-hand end of the cylinder 11. A check valve 30 is adapted to close the opening through the sleeve 25 and is controlled in position by a piston 31 slidable in a small auxiliary cylinder 32.

The right-hand end of the cylinder 32 is connected by a small passage 33 to the opening 23 previously described, and the left-hand end of the cylinder 32 is connected by a small passage 34 to the passage 24 previously described. A spring 35 assists the piston 31 in closing movements of the check valve 30.

A tank T for reserve or surplus oil is mounted on the casing 10 and is connected by a passage 40 to the left-hand end of the cylinder 11. This passage is controlled by a check valve 41 which permits flow from the tank T to the cylinder 11 but does not permit reverse flow. The tank T is also connected through my improved back pressure device D to a passage 44, which in turn is connected to the right-hand end of the cylinder 11.

The pasage 27 previously described is also connected through a by-pass 45 to the right-hand end of the cylinder 11, but this passage is controlled by a check valve 46 which permits flow from the cylinder 11 to the passage 27 but not in the reverse direction.

My improved back pressure device D comprises a casing 50 having a passage 51 connected through an opening 52 to the tank T. The passage 51 also connects with a cross passage 53 which in turn connects with the passage 44 previously described.

A check valve 55 is provided between the passages 51 and 53 and permits flow of oil from the tank T to the passage 44 and cylinder 11 but not in the reverse direction.

A by-pass 60 is provided in the device D, with a port 61 opening into the cross passage 53 and with a port 62 controlled by a valve 64. The valve 64 is in the nature of a needle valve and has a stem 65 threaded into the nut 66 which confines the packing 67 for the stem 65. By turning the stem in the nut, the effective opening through the port 62 may be varied and adjusted.

The port 62 is preferably conical, as shown in Fig. 2, and the valve 64 is of correspondingly conical shape but is preferably slabbed off on two sides as indicated at 67, so that a minimum flow will take place even if the valve is firmly seated.

Having described the construction of my invention and of the broaching machine with which it is adapted for use, the method of operation of the broaching machine and back pressure device is as follows:

During the return movement of the piston 12 and broach head 14 to the left, the flow of oil or other liquid will be as indicated by the arrows in Fig. 1. Oil will be delivered by the pump P through the pipe 21, opening 23 and passage 27 to the inside of the tube 15 and will exert pressure against the closed left-hand end of the tubular piston rod 13, thus forcing the piston rod and broaching head rapidly to the left. The check valve 46 will be closed so that the entire output of the pump is directed into the tube 15.

The oil in the left-hand end of the cylinder 11 is forced out of the cylinder by the movement of the piston and a portion of this oil flows through the passage 24, opening 22 and pipe 20 back to the pump P to replace the oil forced into the tube 15 by the pump.

The oil supplied under pressure to the pipe 21 also acts through the by-pass 33 against the piston 31, moving the check valve 30 to the left-hand position shown in the drawings, so that surplus oil from the left-hand end of the cylinder 11 passes freely through the sleeve 25 and passage 28 to the right-hand end of the cylinder 11 behind the piston 12.

The piston rod 13 is, however, of substantially larger diameter than the tube 15, and furthermore a portion of the oil from the left-hand end of the cylinder is used to supply the pump P.

Consequently, additional oil is necessary to prevent production of a vacuum behind the piston and this additional oil is drawn from the tank T through the passage 51, check valve 55, cross passage 53 and passage 44. The piston 12 then moves freely in the cylinder 11 without suction, and the return stroke is performed at high speed.

When the discharge of the pump P is reversed for the working stroke, the position of the parts and the directions of flow are as shown in Fig. 4. Oil is delivered through the pipe 20 and passage 24 to the left-hand end of the cylinder 11. As this oil is under pressure, it acts through the by-pass 34 against the left-hand face of the piston 31 and moves the check valve 30 to close the opening in the sleeve 25 and shut off the connection to the passage 28.

A portion of the oil in the right-hand end of the cylinder 11 is forced out through the check valve 46, passages 45 and 27 and port 26 to the pipe 21 which is now the intake pipe of the pump P. This oil replaces the oil forced by the pump through the pipe 20, and corresponds in volume thereto.

It has been previously explained, however, that the effective cross section of the cylinder 11 at the right of the piston 12 is greater than the effective cross section at the left of the piston. Consequently more oil must be forced out of the right-hand end of the cylinder than is being supplied to the left-hand end. The surplus oil flows through the passages 44 and 53 and port 61 to the by-pass 60 and thence past the regulating valve 64 to the passage 52 and thus into the tank T.

As this is the only escape for the surplus oil at the right-hand side of the piston 12, the advance movement of the piston during the working stroke can be restrained and controlled as desired by manual adjustment of the valve 64. Consequently the tendency of the broach and piston to jump ahead when the tool resistance is reduced may be effectively overcome.

My improved back pressure device thus provides for regulated resistance to uncontrolled movement of the piston and broach and at the same time provides unrestricted flow of oil to the right-hand end of the cylinder, past the check valve 55, during the rapid return stroke.

By proper adjustment of the valve 64, exactly the right back pressure can be attained to restrain any jumping or uncontrolled movement of the piston and broach, while at the same time the regular working movement of the piston is allowed to take place at the desired speed and without excessive back pressure.

Having thus described my invention and the advantages thereof, I do not wish to be limited to the details herein disclosed, otherwise than as set forth in the claim, but what I claim is:

In a hydraulic machine having a working tool actuated by a piston movable in a fixed cylinder toward the rear end for a working stroke and toward the front end for a return stroke and having a piston rod with a hollow open rear end portion, a tubular member fixed in the rear end of said cylinder and telescoping within said hollow piston rod portion and thereby making the rear end of the cylinder of greater effective cross-sectional area than the front end, said tubular member conveying oil under pressure to said hollow piston rod portion for a return stroke of said piston and tool, a controlled return connection from the front working end of said cylinder to the rear end, a pump connected to supply oil under pressure alternately to the front end of said cylinder and to said tubular member, a storage tank, connections from said tank to each end of said cylinder, and means to prevent flow of oil from the front end of said cylinder to said tank when said cylinder is under pressure, that improvement which comprises interposing in the connection from said tank to the rear end of said cylinder about said fixed tubular member means effective to provide free flow of make-up oil from said tank to said cylinder during a return stroke of said piston and effective to provide restricted flow only to said tank of excess oil discharged from the rear end of said cylinder during a working stroke, thereby limiting the speed of the tool during said working stroke.

DONALD H. WEST.